US011294298B2

(12) United States Patent
Otana

(10) Patent No.: US 11,294,298 B2
(45) Date of Patent: Apr. 5, 2022

(54) IMAGE FORMING APPARATUS WITH TEMPERATURE-BASED EMISSION START TIMING CORRECTION

(71) Applicant: KYOCERA Document Solutions Inc., Osaka (JP)

(72) Inventor: Aiichiro Otana, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 596 days.

(21) Appl. No.: 16/327,410

(22) PCT Filed: Jun. 25, 2018

(86) PCT No.: PCT/JP2018/023982
§ 371 (c)(1),
(2) Date: Feb. 22, 2019

(87) PCT Pub. No.: WO2019/039069
PCT Pub. Date: Feb. 28, 2019

(65) Prior Publication Data
US 2021/0364943 A1    Nov. 25, 2021

(30) Foreign Application Priority Data
Aug. 24, 2017  (JP) .............................. JP2017-161347

(51) Int. Cl.
*G03G 15/00*    (2006.01)
*G03G 15/043*   (2006.01)
*G02B 26/12*    (2006.01)

(52) U.S. Cl.
CPC ......... *G03G 15/043* (2013.01); *G02B 26/123* (2013.01); *G02B 26/127* (2013.01); *G03G 15/5008* (2013.01); *G03G 15/5045* (2013.01)

(58) Field of Classification Search
USPC ........................................................ 399/51
See application file for complete search history.

(56) References Cited

U.S. PATENT DOCUMENTS

| | | |
|---|---|---|
| 2010/0189451 A1 | 7/2010 | Murayama |
| 2015/0338769 A1* | 11/2015 | Koga ................... G03G 21/14 |
| | | 347/118 |

FOREIGN PATENT DOCUMENTS

| | | | |
|---|---|---|---|
| JP | 2010175711 A | | 8/2010 |
| JP | 2016153203 A | * | 8/2016 |
| JP | 2016153203 A | | 8/2016 |
| JP | 2017037216 A | | 2/2017 |

* cited by examiner

*Primary Examiner* — Quana Grainger
(74) *Attorney, Agent, or Firm* — Alleman Hall Creasman & Tuttle LLP

(57) ABSTRACT

An image forming apparatus with accurate color shift correction with consideration of a change in a rotational speed of a driving portion of a laser scanning member includes a light source, the laser scanning member, a driving portion, a speed controlling portion, a light detecting portion, a light source controlling portion, a scanning lens, a housing, a temperature gradient detecting portion, a first temperature detecting portion, and a correction processing portion. The temperature gradient detecting portion detects a temperature gradient in the housing. The first temperature detecting portion detects a temperature of the scanning lens. The correction processing portion corrects an emission start timing at which light corresponding to a line of image data is emitted from the light source, based on the temperatures detected by the temperature gradient detecting portion and the first temperature detecting portion, the rotational speed of the driving portion, and a preset arithmetic expression.

4 Claims, 7 Drawing Sheets

FIG. 6

| TIME ELAPSED t1 (MINUTES) | DETECTED COLOR SHIFT AMOUNT d2 (PIXELS) | TEMPERATURE T1 OF SCANNING LENS (°C) | TEMPERATURE T2 OF LIGHT DETECTING PORTION (°C) | CALCULATED COLOR SHIFT AMOUNT d1 (PIXELS) | POST-CORRECTION COLOR SHIFT AMOUNT d3 (PIXELS) |
|---|---|---|---|---|---|
| 0 | 0.00 | 25 | 23 | – | – |
| 1 | 0.50 | 26 | 24 | 1.00 | −0.50 |
| 2 | 0.80 | 27 | 24 | 1.45 | −0.65 |
| 3 | 0.90 | 28 | 25 | 1.35 | −0.45 |
| 4 | 1.00 | 28 | 25 | 1.35 | −0.35 |
| 5 | 1.00 | 29 | 26 | 1.25 | −0.25 |
| 6 | 1.00 | 29 | 26 | 1.25 | −0.25 |
| 7 | 1.20 | 30 | 26 | 1.70 | −0.50 |
| 8 | 1.10 | 30 | 27 | 1.15 | −0.05 |
| 9 | 1.20 | 30 | 27 | 1.15 | 0.05 |
| 10 | 1.25 | 31 | 27 | 1.60 | −0.35 |
| 11 | 1.30 | 31 | 28 | 1.05 | 0.25 |
| 12 | 1.40 | 32 | 28 | 1.50 | −0.10 |
| 13 | 1.50 | 32 | 28 | 1.50 | 0.00 |
| 14 | 1.40 | 32 | 28 | 1.50 | −0.10 |
| 15 | 1.70 | 33 | 29 | 1.40 | 0.30 |
| 16 | 1.70 | 33 | 29 | 1.40 | 0.30 |
| 17 | 2.00 | 33 | 29 | 1.40 | 0.60 |
| 18 | 1.80 | 33 | 29 | 1.40 | 0.40 |
| 28 | 0.80 | 30 | 29 | 0.05 | 0.75 |
| 38 | 0.30 | 31 | 30 | −0.05 | 0.35 |
| 48 | 0.10 | 31 | 30 | −0.05 | 0.15 |
| 78 | −0.50 | 31 | 30 | −0.05 | −0.45 |
| 108 | −0.70 | 31 | 31 | −0.60 | −0.10 |
| 138 | −0.80 | 32 | 31 | −0.15 | −0.65 |
| 168 | −0.70 | 32 | 31 | −0.15 | −0.55 |
| 198 | −0.90 | 32 | 31 | −0.15 | −0.75 |

IMAGE FORMING APPARATUS WITH TEMPERATURE-BASED EMISSION START TIMING CORRECTION

TECHNICAL FIELD

The present invention relates to an electrophotographic image forming apparatus.

BACKGROUND ART

In a tandem-type image forming apparatus including a plurality of image forming units, there is a risk of so-called color shift being generated, in which relative positions of toner images of colors formed on image-carrying members of the image forming units are shifted in a scanning direction (main scanning direction) of light irradiated on the image-carrying members from a laser scanning unit. For example, in this type of image forming apparatus, color shift may be generated by expansion and contraction of an optical member due to a temperature change inside the apparatus. To solve this problem, in the image forming apparatus, a color shift correction process may be executed, in which color shift is corrected based on a temperature gradient in a housing of the laser scanning unit, and a preset arithmetic expression (for example, see PTL1).

CITATION LIST

Patent Literature

PTL 1 Japanese Patent Application Publication No. 2016-153203

SUMMARY OF THE INVENTION

Problems to be Solved by the Invention

Meanwhile, in the laser scanning unit, a driving portion is provided that is configured to rotate a laser scanning member for scanning light. In the image forming apparatus, the rotational speed of the driving portion may be changed in response to sheet type, resolution, or the like. Here, since a calorific value of the driving portion changes when the rotational speed of the driving portion changes, a relationship between the temperature gradient in the housing of the laser scanning unit and an appropriate color shift correction amount may change before and after the change of the rotational speed. As a result, color shift may not be sufficiently corrected in a color shift correction based on a preset constant arithmetic expression.

The present invention has been made in view of such conventional circumstances, and it is an object of the present invention to provide an image forming apparatus capable of improving accuracy of color shift correction with consideration of the change in the rotational speed of the driving portion of the laser scanning member.

Solution to the Problems

An image forming apparatus according to an aspect of the present invention includes a light source, a laser scanning member, a driving portion, a speed controlling portion, a light detecting portion, a light source controlling portion, a scanning lens, a housing, a temperature gradient detecting portion, a first temperature detecting portion, and a correction processing portion. The laser scanning member scans light emitted from the light source. The driving portion rotationally drives the laser scanning member. The speed controlling portion changes a rotational speed of the driving portion based on a preset image forming condition. The light detecting portion detects light made incident at a predetermined position along a scanning path of light scanned by the laser scanning member. The light source controlling portion, for each detection of light by the light detecting portion, causes the light source to emit light corresponding to a line of image data at a preset emission start timing. The scanning lens causes the light scanned by the laser scanning member to scan on an image-carrying member at a constant speed. The light source, the laser scanning member, the light detecting portion, and the scanning lens are disposed inside the housing. The temperature gradient detecting portion detects a temperature gradient in the housing. The first temperature detecting portion detects a temperature of the scanning lens. The correction processing portion corrects the emission start timing based on detected temperatures by the temperature gradient detecting portion and the first temperature detecting portion, the rotational speed of the driving portion, and a preset arithmetic expression.

Advantageous Effects of the Invention

According to the present invention, it is possible to provide an image forming apparatus capable of improving accuracy of color shift correction with consideration of a change in a rotational speed of a laser scanning member.

BRIEF DESCRIPTION OF THE DRAWINGS

FIG. 6 is a diagram for explaining the setting method of the coefficients used in the image forming apparatus according to the embodiment of the present invention.

DESCRIPTION OF EMBODIMENT

The following describes an embodiment of the present invention with reference to the accompanying drawings for the understanding of the invention. It should be noted that the following embodiment is an example of a specific embodiment of the present invention and should not limit the technical scope of the present invention.

Figure 1:
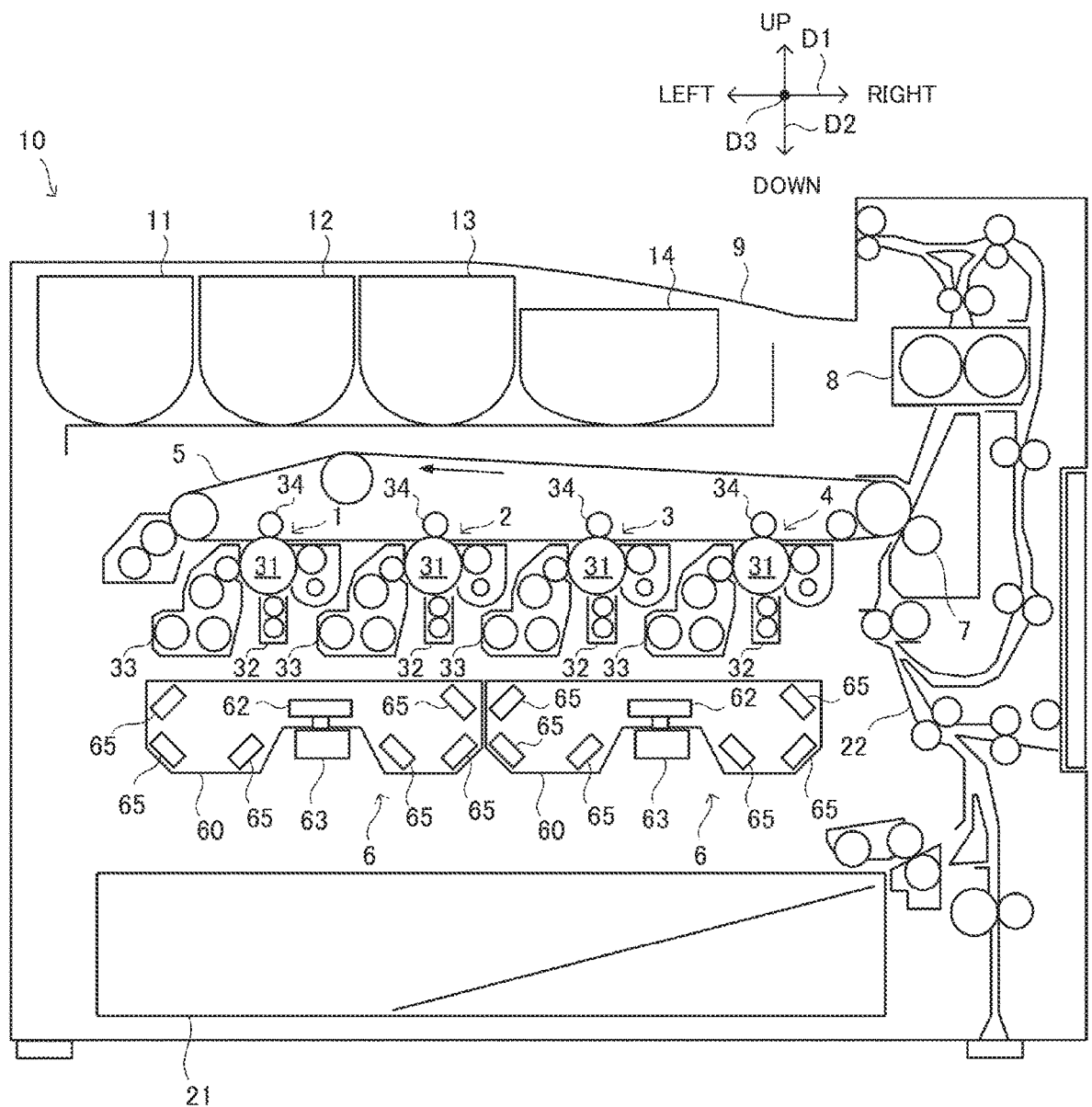
FIG. 1 is a diagram showing a configuration of an image forming apparatus according to an embodiment of the present invention.

As shown in FIG. 1, an image forming apparatus 10 includes a plurality of image forming units 1 to 4, an intermediate transfer belt 5, laser scanning units 6, a secondary transfer roller 7, a fixing device 8, a sheet discharge tray 9, toner containers 11 to 14, a sheet supplying cassette 21, and a conveyance path 22. The image forming apparatus 10 is a printer configured to form a color or monochrome image on a sheet supplied from the sheet supplying cassette 21 along the conveyance path 22, and discharge the sheet to the sheet discharge tray 9. It is noted that the following description uses a left-right direction D1, an up-down direction D2, and a front-rear direction D3 defined in the drawings for explanation.

In the present embodiment, the image forming apparatus 10 includes two laser scanning units 6 in correspondence with the image forming units 1 to 4. On the other hand, a configuration in which four laser scanning units are respectively provided in correspondence with the image forming units 1 to 4, or a configuration in which one laser scanning unit is provided in correspondence with the image forming units 1 to 4, may be considered as another embodiment. In addition, an image forming apparatus according to the present invention is not limited to a printer, and may be, for example, a facsimile, a copier, or a multifunction peripheral.

The image forming units 1 to 4 are juxtaposed along the intermediate transfer belt 5 to form a so-called tandem-type image forming portion. Specifically, the image forming units 1 to 4 form toner images corresponding to Y (yellow), C (cyan), M (magenta), and K (black). The image forming units 1 to 4 are electrophotographic image forming units each including a photoconductor drum 31, a charging portion 32, a developing portion 33, a primary transfer roller 34, or the like.

In each of the image forming units 1 to 4, after the photoconductor drum 31 is charged by the charging portion 32, an electrostatic latent image corresponding to image data is formed on the photoconductor drum 31 by light emitted from the laser scanning unit 6. Thereafter, the electrostatic latent image formed on the photoconductor drum 31 is developed by the developing portion 33 using developer such as toner or the like. The toner images formed on the photoconductor drums 31 are sequentially transferred to the intermediate transfer belt 5 by the primary transfer rollers 34. With this configuration, a color or monochrome toner image is formed on the intermediate transfer belt 5. Thereafter, the toner image on the intermediate transfer belt 5 is transferred to a sheet by the secondary transfer roller 7, and is fused and fixed to the sheet by the fixing device 8.

Figure 2:
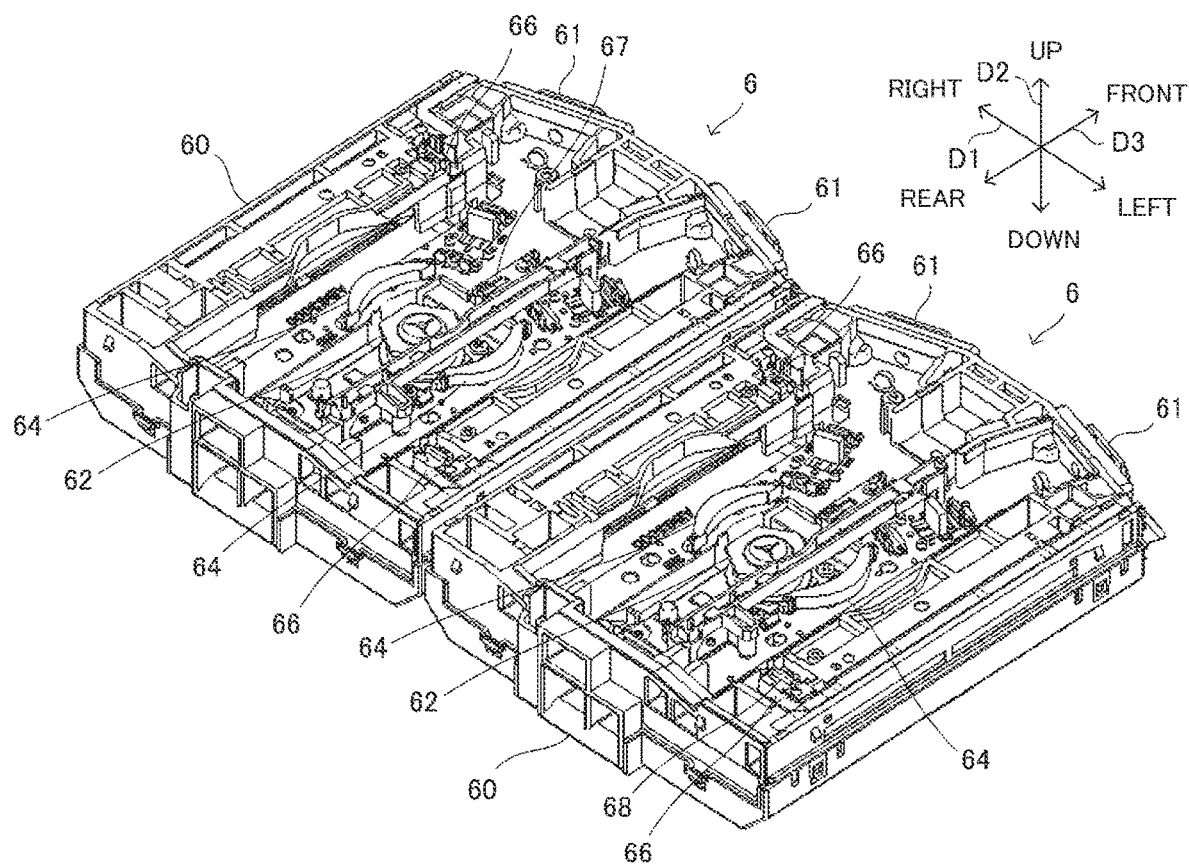
FIG. 2 is a diagram showing a configuration of a laser scanning unit according to the embodiment of the present invention.

Next, the laser scanning unit 6 is described. The laser scanning unit 6 is configured to scan laser light on the photoconductor drums 31 to form electrostatic latent images on surfaces of the photoconductor drums 31 corresponding to image data. Specifically, as shown in FIG. 1 and FIG. 2, each laser scanning unit 6 includes two light sources 61, a polygon mirror 62, a motor 63, two fθ lenses 64, a plurality of reflective mirrors 65, and two light detecting portions 66, all of which are disposed inside a housing 60. In addition, one of the two laser scanning units 6 is provided with a first temperature detecting portion 67, and the other laser scanning unit 6 is provided with a second temperature detecting portion 68. It is noted that although a cover member is attached to an upper surface of the housing 60 of the laser scanning unit 6, the cover member is omitted in FIG. 2.

Each of the light sources 61 is, for example, a laser diode configured to emit laser light. The polygon mirror 62 includes six reflective surfaces at which two beams of laser light emitted from the two light sources 61 are reflected, and is a rotary polygon mirror that is rotatably supported by the motor 63. It is noted that the polygon mirror 62 is an example of a laser scanning member. The motor 63 is an example of a driving portion for rotationally driving the polygon mirror 62. The polygon mirror 62 scans the two beams of laser light emitted from the two light sources 61 in different directions by being rotationally driven by the motor 63. Hereinafter, a scanning direction of laser light by the polygon mirror 62 is referred to as a main scanning direction (a direction parallel to the front-rear direction D1 in FIG. 2), and a direction orthogonal to the main scanning direction on the surface of the photoconductor drum 31 is referred to as a sub-scanning direction.

Each of the fθ lenses 64 is a scanning lens configured to condense laser light scanned in the main scanning direction by the polygon mirror 62, onto the surface of the photoconductor drum 31 that is an irradiation target, and scan the laser light at a constant speed. The four fθ lenses 64 shown in FIG. 2 respectively correspond to, in sequence from left to right in FIG. 2, the four image forming units 1 to 4 for yellow, cyan, magenta, and black.

Each of the reflective mirrors 65 is a reflective member elongated in the main scanning direction in which laser light is scanned by the polygon mirror 62, and is supported at both of its sides in a longitudinal direction by the housing 60. The reflective mirrors 65 sequentially reflect laser light that has passed through the fθ lenses 64, and guide the light to the surfaces of the photoconductor drums 31.

The light detecting portions 66 are provided in correspondence with the image forming units 1 to 4, disposed at predetermined positions in scanning paths of laser light scanned in the main scanning direction by the polygon mirrors 62, and are configured to detect incidence of laser light. For example, each of the light detecting portions 66 is provided near a corner portion of the housing 60. In the image forming apparatus 10, based on a detection timing of laser light by the light detecting portion 66, an emission start timing of laser light corresponding to a line of image data, that is, a write out timing of an image of the line is controlled by a control portion 100 described later. It is noted that the light detecting portion 66 may be provided in one of any of the image forming units 1 to 4 in another embodiment. In addition, in a further embodiment, one light detecting portion 66 may be provided in correspondence with the image forming units 1 and 2, and another light detecting portion 66 may be provided in correspondence with the image forming units 3 and 4.

The first temperature detecting portion 67 is provided, among the two laser scanning units 6, in the laser scanning unit 6 provided on a right side that corresponds to black and magenta. The first temperature detecting portion 67 is a thermistor or the like used for detecting temperature of one of the fθ lenses 64. In addition, the second temperature detecting portion 68 is provided, among the two laser scanning units 6, in the laser scanning unit 6 provided on a left side that corresponds to cyan and yellow. The second temperature detecting portion 68 is a thermistor or the like used for detecting temperature of one of the light detecting portions 66. For example, as shown in FIG. 2, the first temperature detecting portion 67 is disposed near a center portion of the housing 60, and the second temperature detecting portion 68 is disposed near a corner portion of the housing 60. That is, the first temperature detecting portion 67 and the second temperature detecting portion 68 are disposed in positions separated by a specific distance in the housing 60, and detected temperatures by the first temperature detecting portion 67 and the second temperature detecting portion 68 can be used as indicators of a temperature gradient in the housing 60. It is noted that the second temperature detecting portion 68 is not limited to being provided for a purpose of detecting the temperature of the light detecting portion 66, and may be provided for a purpose of detecting temperature near an outer edge portion of the housing 60.

Meanwhile, the motor 63 configured to rotate the polygon mirror 62 for scanning light is provided in the laser scanning unit 6. In the image forming apparatus 10, a rotational speed of the motor 63 may be changed in response to sheet type, resolution, or the like. In this case, since calorific value of the motor 63 changes when the rotational speed of the motor 63 changes, a relationship between the temperature gradient in the housing 60 of the laser scanning unit 6 and an appropriate color shift correction amount can change before and after the change in the rotational speed. As a result, in a color shift correction based on a preset constant arithmetic expression, there is a risk that color shift is not sufficiently corrected. On the other hand, in the image forming apparatus 10, accuracy of the color shift correction can be improved with consideration of the change in the rotational speed of the motor 63.

Figure 3:
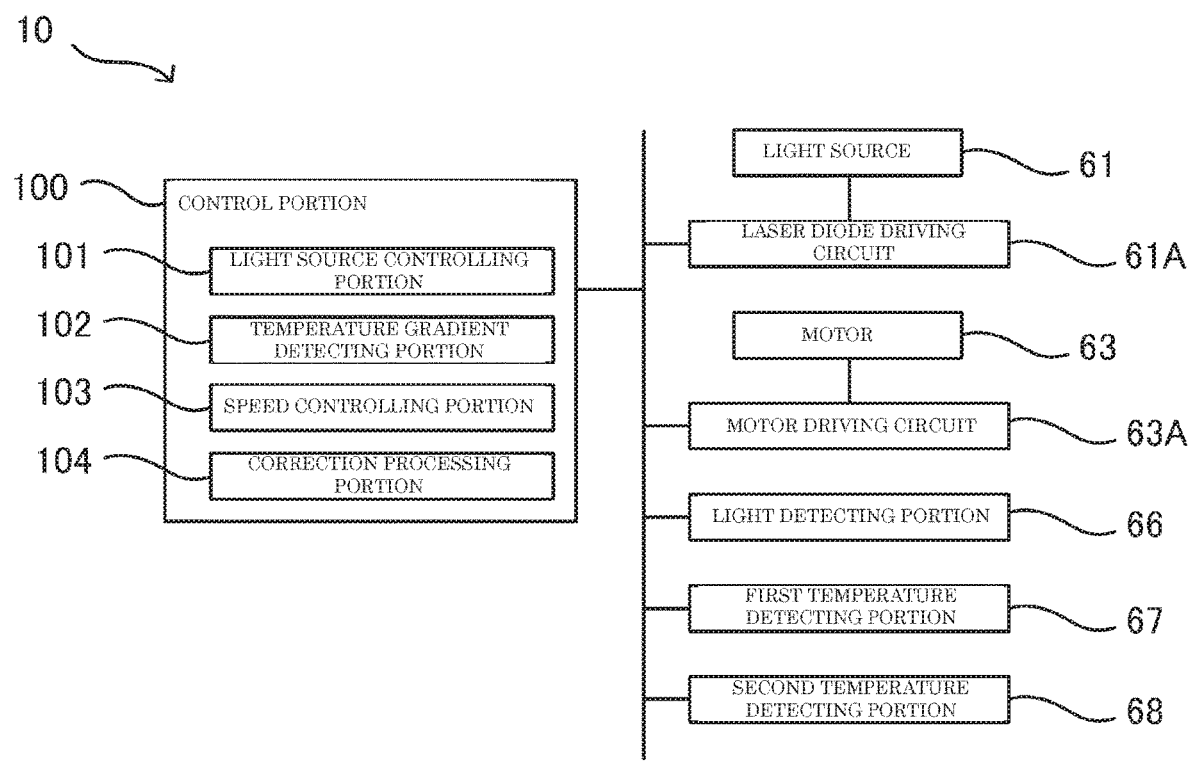
FIG. 3 is a block diagram showing a system configuration of the image forming apparatus according to the embodiment of the present invention.

Specifically, as shown in FIG. 3, the image forming apparatus 10 includes the control portion 100 configured to control image forming operations in the image forming apparatus 10. It is noted that the control portion 100 may be a main control portion for integrally controlling the image forming apparatus 10 as a whole, or provided separately from the main control portion. An LD driving circuit 61A, a motor driving circuit 63A, the light detecting portions 66, the first temperature detecting portion 67, the second temperature detecting portion 68, or the like are connected to the control portion 100. The LD driving circuit 61A is a circuit for making the light sources 61 emit light, and the motor driving circuit 63A is a circuit for controlling rotation of the motors 63.

The control portion 100 includes a CPU, a ROM, a RAM, an EEPROM (registered trademark), or the like. In addition, the control portion 100 includes a light source controlling portion 101, a temperature gradient detecting portion 102, a speed controlling portion 103, and a correction processing portion 104. Specifically, the control portion 100 functions as the light source controlling portion 101, the temperature gradient detecting portion 102, the speed controlling portion 103, and the correction processing portion 104 by allowing the CPU to execute processes according to control programs stored in the ROM. It is noted that the light source controlling portion 101, the temperature gradient detecting portion 102, the speed controlling portion 103, and the correction processing portion 104 may be configured by an electric circuit(s) such as an ASIC(s).

The light source controlling portion 101 is configured to, for each detection of laser light by the light detecting portion 66 of any one of the image forming units 1 to 4, causes a light source 61 of the any one of the image forming units 1 to 4 to emit light corresponding to a line of image data at a preset emission start timing. For example, upon detection of laser light by the light detecting portion 66 of the image forming unit 1, the light source 61 corresponding to the image forming unit 1 irradiates laser light corresponding to data of one line of image data on the photoconductor drum 31, after a preset specific amount of time elapses from the time of the detection. That is, in each of the image forming units 1 to 4, the write out timing of an image in the main scanning direction on the photoconductor drum 31 is determined by the detection timing of laser light by the light detecting portion 66.

The temperature gradient detecting portion 102 executes a process for detecting the temperature gradient in the housing 60. Specifically, the temperature gradient detecting portion 102 calculates a difference between the temperatures detected by the first temperature detecting portion 67 and the second temperature detecting portion 68 as the temperature gradient. It is noted that the temperature gradient detecting portion 102 may detect the temperature gradient based on detected temperatures by three or more temperature detecting portions.

The speed controlling portion 103 changes a conveyance speed (hereinafter referred to as a "linear speed") of the sheet that is an object for image formation, based on image forming conditions such as sheet size, sheet type, presence/absence of duplex printing, and print image quality, that are preset by a user operation or the like on the image forming apparatus 10. In addition, the speed controlling portion 103, based on the image forming conditions, changes the rotational speed of the photoconductor drum 31 of each of the image forming units 1 to 4, a running speed of the intermediate transfer belt 5, the rotational speed of the motor 63 of each of the laser scanning units 6, or the like, along with changing the linear speed. For example, in a case where a thick sheet such as cardboard is used, or in a case where resolution is set to twice as much as normal, the speed controlling portion 103 may change the conveyance speed of the sheet and the rotational speed of the motor 63 to half as much as for normal printing. Hereinafter, a preset rotational speed of the motor 63 for normal printing is referred to as a normal rotational speed, and a rotational speed of the motor 63 that is half as much as normal is referred to as a changed rotational speed.

The correction processing portion 104 corrects the emission start timing in each of the image forming units 1 to 4 based on detected temperatures by the temperature gradient detecting portion 102 and the first temperature detecting portion 67, the rotational speed of the motor 63, and a preset arithmetic expression. Specifically, the correction processing portion 104 calculates a shift amount of the emission start timing based on the temperature gradient detected by the temperature gradient detecting portion 102, a change in the detected temperature by the first temperature detecting portion 67, and the arithmetic expression, then corrects the emission start timing based on the shift amount. In addition, the correction processing portion 104 changes content of the arithmetic expression in response to change in the rotational speed of the motor 63 by the speed controlling portion 103. Specifically, the faster the rotational speed of the motor 63 is, the more the correction processing portion 104 changes the content of the arithmetic expression in a direction in which the correction amount of the emission start timing increases. It is noted that since the rotational speed of the motor 63 and the conveyance speed of the sheet are changed together, the correction processing portion 104 may change the content of the arithmetic expression in response to change in the conveyance speed of the sheet, instead of change in the rotational speed of the motor 63.

In the present embodiment, a shift amount of a toner image formed by the image forming unit 3 for magenta obtained with reference to a preset toner image formed by the image forming unit 4 for black is calculated as the shift amount of the emission start timing. Here, a change in shape of the housing 60 caused by temperature change occurs in a same way in the two laser scanning units 6 included in the image forming apparatus 10. Accordingly, the shift amount between the toner images of black and magenta can be regarded as a shift amount of a toner image formed by the image forming unit 1 for yellow obtained with reference to a toner image formed by the image forming unit 2 for cyan. Thus, the correction processing portion 104 realizes the color shift correction by changing emission start timings of the image forming units 1 and 3 with reference to the image forming units 2 and 4, based on the calculated shift amount at the emission start timing.

Here, a detected temperature by the first temperature detecting portion 67 at a predetermined reference time period is a temperature T0, a temperature detected at a present time by the first temperature detecting portion 67 is a temperature T1, and a temperature detected at a present time by the second temperature detecting portion 68 is a temperature T2. In addition, the temperature gradient in the housing 60 is a temperature gradient Tg, a change amount in the detected temperature by the first temperature detecting portion 67 is a temperature change amount Td, the shift amount of the emission start timing is a calculated color shift amount d1, and preset constants are K1 and K2. In this case, the arithmetic expression is expressed by an expression (1) below. The expression (1) calculates the calculated color slippage amount d1 before the rotational speed of the motor 63 is changed. Hereinafter, the expression (1) may be referred to as a first arithmetic expression.

$$d1 = K1 \times Tg + K2 \times Td \quad (1)$$

During the reference time period, a color shift correction is executed. The color shift correction is referred to as a color registration, and is executed by the control portion 100, for example, when the image forming apparatus 10 is powered on, or returns from a power saving mode. In the color shift correction process, for example, after a specific toner image is actually formed on the intermediate transfer belt 5 using the image forming units 1 to 4, and a color shift amount is detected using a density sensor or the like, the emission start timings of the image forming units 1 to 4 are changed based on the color shift amount. That is, the temperature T0 is set as a value indicating the detected temperature by the first temperature detecting portion 67 when a color shift is not occurring. The temperature T0 is stored in the RAM or the like of the control portion 100, and deleted when the image forming apparatus 10 is powered off, moves to the power saving mode, or the like.

Figure 4:
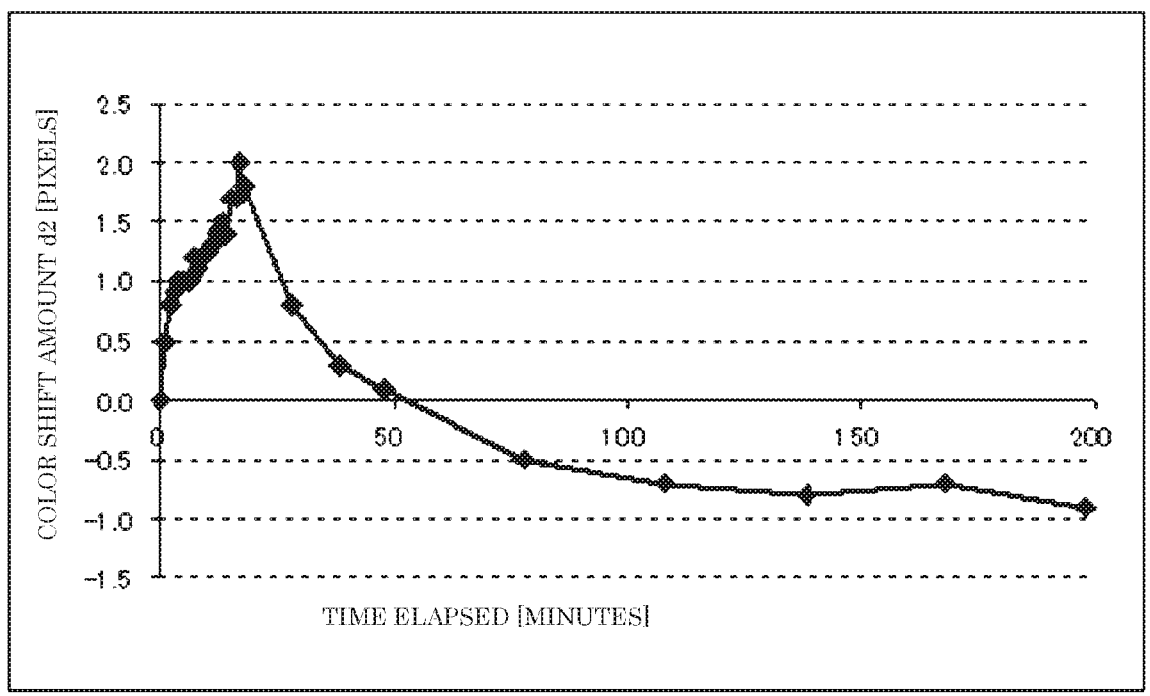
FIG. 4 is a diagram for explaining a setting method of coefficients used in the image forming apparatus according to the embodiment of the present invention.
Figure 5:
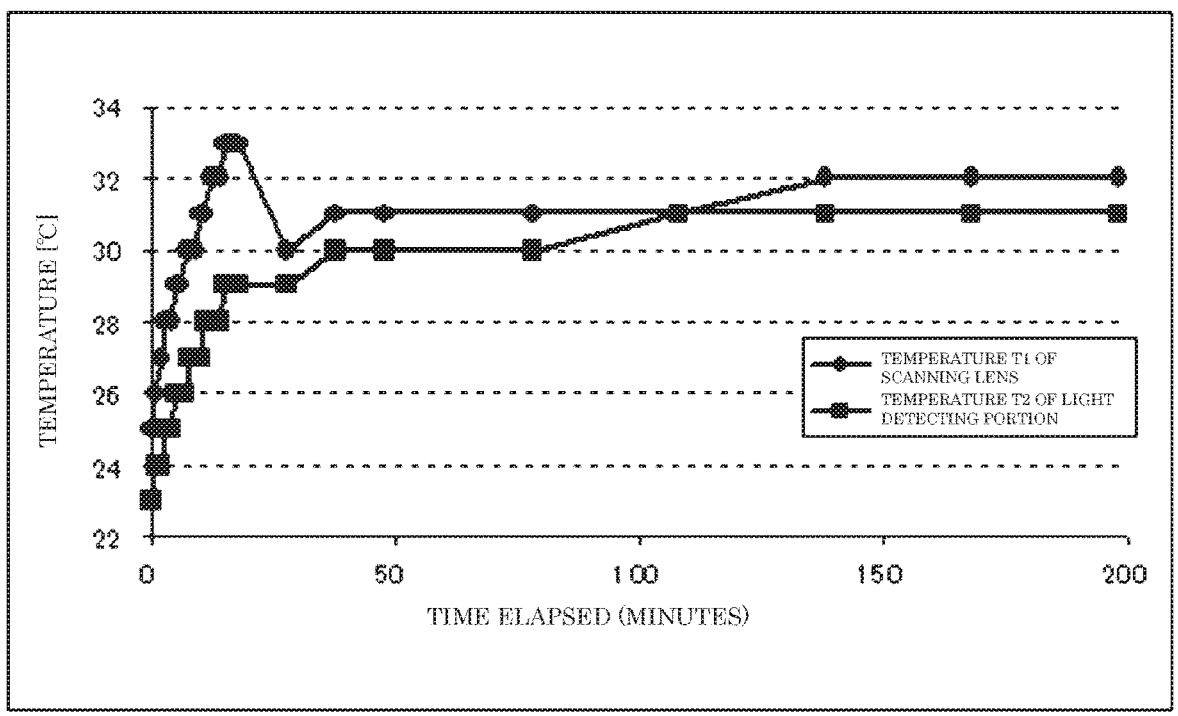
FIG. 5 is a diagram for explaining the setting method of the coefficients used in the image forming apparatus according to the embodiment of the present invention.

In addition, the coefficient K1 and the coefficient K2 included in the first arithmetic expression are constants that are preset based on a result of a preliminarily conducted experiment or simulation. Here, with reference to FIG. 4 to FIG. 6, an example of a setting method of the coefficient K1 and the coefficient K2 is described. FIG. 4 to FIG. 6 show a detected color shift amount d2 indicating a color shift amount that was actually generated when printing was intermittently executed, and the temperature T1 and the temperature T2 detected by the first temperature detecting portion 67 and the second temperature detecting portion 68, after 18 minutes of continuous printing was executed by the image forming apparatus 10. It is noted that the rotational speed of the motor 63 during printing is the preset normal rotational speed, and a value of the coefficient K1 and a value of the coefficient K2 set here are values appropriate for performing color shift correction in a case of the normal rotational speed.

In addition, FIG. 6 shows the calculated color shift amount d1 calculated by substituting the temperature T1 and the temperature T2 detected by the first temperature detecting portion 67 and the second temperature detecting portion 68 in the first arithmetic expression, and a post-correction color shift amount d3 that indicates a difference (d2−d1) between the calculated color shift amount d1 and the detected color shift amount d2. The post-correction color shift amount d3 is a value indicating an amount of color shift that remains after the color shift correction is performed based on the calculated color shift amount d1.

A table shown in FIG. 6 shows data of spreadsheet software created for consulting data that corresponds to results of calculations performed based on the first arithmetic expression. When arbitrary values of the coefficient K1 and the coefficient K2 are input, the spreadsheet software automatically calculates and displays values of the calculated color shift amount d1 and the post-correction color shift amount d3.

Specifically, FIG. 6 shows calculation results for a case where the coefficient K1 is set as "0.55", and the coefficient K2 is set as "−0.10". These values of the coefficient K1 and the coefficient K2 are obtained as a result of searching for the coefficient K1 and the coefficient K2 when the difference between the calculated color shift amount d1 and the detected color shift amount d2 is smallest, by changing the values of the coefficient K1 and the coefficient K2 using data of the spreadsheet software shown in FIG. 6. That is, these values of the coefficient K1 and the coefficient K2 are those of when the post-correction color shift amount d3 is smallest. In this way, in the image forming apparatus 10, values of the coefficient K1 and the coefficient K2 of when the difference between the calculated color shift amount d1 and the detected color shift amount d2 is smallest are preset for each model of the image forming apparatus 10, and stored in, for example, the ROM of the control portion 100.

Meanwhile, as described above, since the calorific value of the motor 63 changes when the rotational speed of the motor 63 changes, the relationship between the temperature gradient in the housing 60 of the laser scanning unit 6 and the appropriate color shift correction amount can change. Accordingly, the correction processing portion 104 changes the content of the arithmetic expression by changing the coefficients K1 and K2 in response to the rotational speed of the motor 63 in an image formation controlling process described later. Specifically, the correction processing portion 104 increases at least one of the coefficient K1 and the coefficient K2 in response to an increase of the rotational speed of the motor 63. With this configuration, the higher the rotational speed of the motor 63 is, the larger the calculated color shift amount d1 and the correction amount are, and it is possible to perform color correction with consideration of a transition in the temperature gradient in the housing 60 resulting from the change in the calorific value caused by the change in the rotational speed of the motor 63.

For example, in a case with a configuration in which the rotational speed of the motor 63 can be switched between multiple stages, the coefficients K1 and K2 are set in advance in correspondence with each rotational speed of the motor 63, and the coefficients K1 and K2 used for calculation of the calculated color shift amount d1 are switched in response to switching of the rotational speed of the motor 63. Specifically, in a case where there are two types of changeable rotational speeds of the motor 63 that are the normal rotational speed and the changed rotational speed, values of two types of the coefficients K1 and K2 are preset. It is noted that the coefficients K1 and K2 for performing appropriate color shift correction in correspondence to each of the rotational speeds of the motor 63 may be individually set, for example, by the aforementioned setting method. In addition, the coefficient K1 and coefficient K2 corresponding to each of the rotational speeds of the motor 63 may be preset for each model of the image forming apparatus 10.

However, in a case as described above where the coefficients K1 and K2 are changed in response to the rotational speed of the motor 63, there is a risk of the calculated color shift amount d1 largely changing before and after the change of the rotational speed of the motor 63. On the other hand, in the image forming apparatus 10, sudden change in correction amount before and after the change of the rotational speed of the motor 63 is prevented. Specifically, during the image formation controlling process described later, the calculated color shift amount d1 is calculated based on the first arithmetic expression before the change of the rotational speed of the motor 63, but after the change of the rotational speed of the motor 63, the calculated color shift amount d1 is calculated based on an expression (2) described below. Here, a detected temperature by the first temperature detecting portion 67 at a time of switching of the coefficients K1 and K2 is the temperature T1, and a temperature difference between the temperature T1 and the temperature T2 that occurs later than the switching of the coefficients K1 and K2 is the temperature gradient Tg. It is noted that d0 is a value of the calculated color shift amount d1 before the change of the rotational speed of the motor 63. Hereinafter, expression (2) may be referred to as a second arithmetic expression.

$$d1 = K1 \times Tg + K2 \times Td + d0 \quad (2)$$

[Image Formation Controlling Process]

Figure 7:
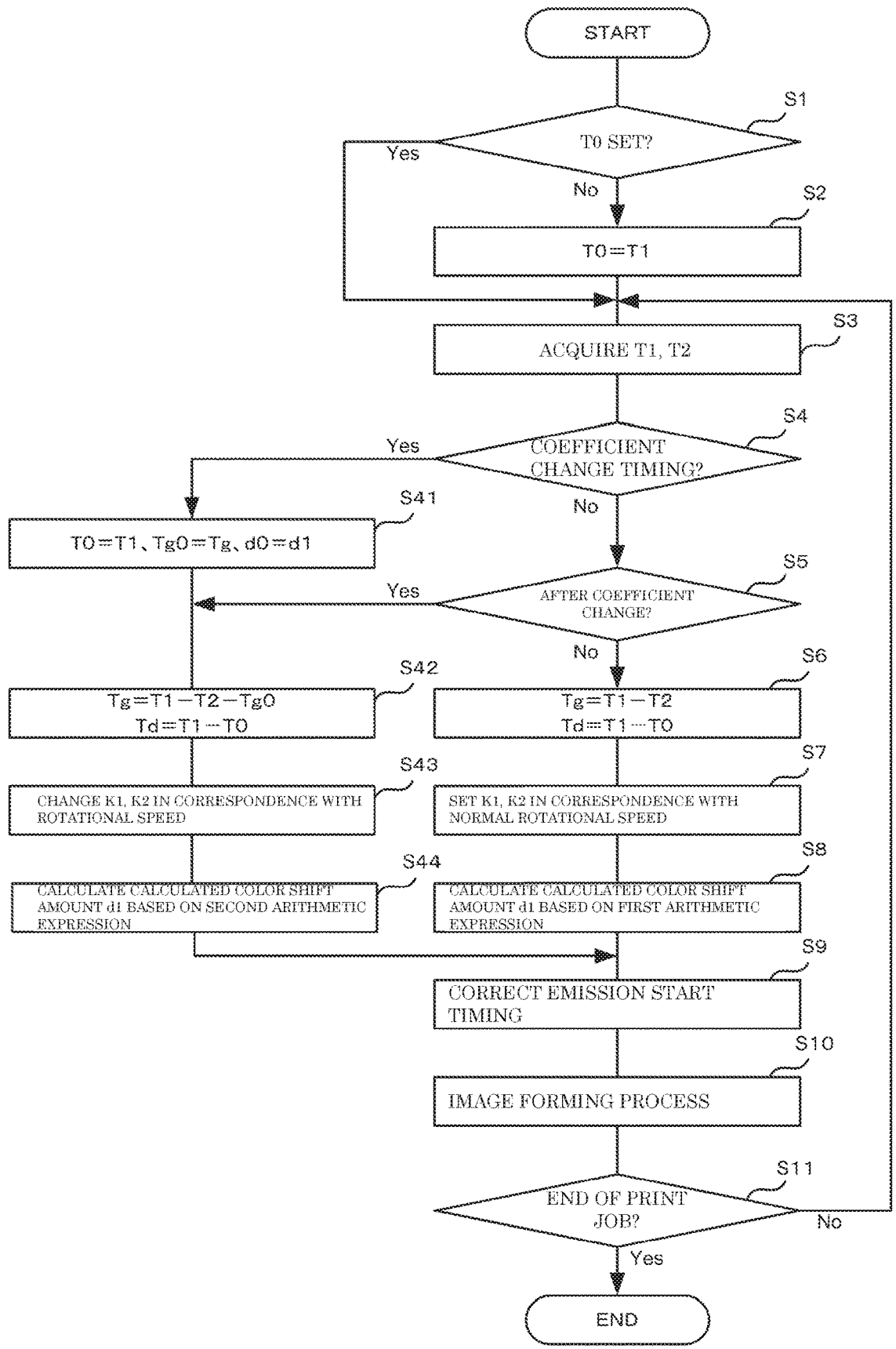
FIG. 7 is a flowchart showing an example of a procedure for an image formation controlling process executed in the image forming apparatus according to the embodiment of the present invention.

Below, with reference to FIG. 7, a description is given of the image formation controlling process executed by the control portion 100 in the image forming apparatus 10. It is noted that the control portion 100, for example, executes the image formation controlling process when the control portion 100 receives a print job from an information processing device such as an external personal computer or the like.

<Step S1>

In step S1, the control portion 100 determines whether or not a detected temperature by the first temperature detecting portion 67 at a time of execution of the color registration in the image forming apparatus 10 has been set as the temperature T0. Here, when the control portion 100 determines that the temperature T0 has not been set (S1: No), the control portion 100 moves the process to step S2, and when the control portion 100 determines that the temperature T0 has been set (S1: Yes), the control portion 100 moves the process to step S3.

<Step S2>

In step S2, the control portion 100 acquires the temperature T1 of the fθ lens 64 using the first temperature detecting portion 67, and sets the temperature T1 as the temperature T0. That is, in this case, the reference time period corresponding to the temperature T0 in the first arithmetic expression is a start time of the image formation controlling process.

<Step S3>

In step S3, the control portion 100 uses the first temperature detecting portion 67 and the second temperature detecting portion 68 to acquire the temperature T1 of the fθ lens 64 and the temperature T2 of the light detecting portion 66 at a present time. The temperature T1 and temperature T2 gradually increase along with execution of an image forming process in the image forming apparatus 10, and gradually decrease after the image forming ends.

<Step S4>

In step S4, the control portion 100 determines whether or not a coefficient change timing for changing at least one of the coefficient K1 and K2 has come. Specifically, the control portion 100 determines that the coefficient change timing has come when the rotational speed of the motor 63 has been changed to a rotational speed different from the preset normal rotational speed due to a change of the linear speed. Here, when the control portion 100 determines that the coefficient change timing has not come (S4: No), the process moves to step S5, and when the control portion 100 determines that the coefficient change timing has come (S4: Yes), the control portion 100 moves the process to step S41.

<Step S5>

In step S5, the control portion 100 determines whether or not the coefficient K1 or the coefficient K2 has been changed for the present print job. Specifically, in step S43 described later, the control portion 100 sets a coefficient change flag to ON when it changes the values of the coefficients K1 and K2, and the control portion 100 sets the coefficient change flag to OFF when it determines that the print job has ended in step S11 described later. With this configuration, the control portion 100 can determine whether or not the coefficients have been changed by referring to the coefficient change flag. Here, when the control portion 100 determines that the coefficient change has not been performed (S5: No), the process moves to step S6, and when the control portion 100 determines that the coefficient change has been performed (S5: Yes), the process moves to step S42.

In step S6, the control portion 100 calculates the temperature gradient Tg and the temperature change amount Td. Specifically, the control portion 100 calculates, as the temperature gradient Tg, a temperature difference (T1−T2) between the temperature T1 and the temperature T2 at a present time that are detected by the first temperature detecting portion 67 and the second temperature detecting portion 68. In addition, the control portion 100 calculates a temperature difference (T1−T0) between the temperature T1 and the temperature T0 as the temperature change amount Td.

<Step S7>

In step S7, the control portion 100 sets the coefficients K1 and K2 used in the first arithmetic expression to preset values for performing appropriate color shift correction when the rotational speed of the motor 63 is the normal rotational speed.

<Step S8>

In step S8, the control portion 100 calculates the calculated color shift amount d1 based on the temperature T1 and temperature T2 acquired from the first temperature detecting portion 67 and the second temperature detecting portion 68, and the first arithmetic expression. More specifically, the calculated color shift amount d1 is calculated by substituting the temperature gradient Tg and temperature change amount Td calculated in step S6, and the coefficients K1 and K2 set in step S7, in the first arithmetic expression. With the calculated color shift amount d1 calculated in this way, it is possible to estimate a color shift amount generated when a color image is formed by the image forming units 1 to 4 at the present time.

<Step S41>

In step S41, the control portion 100 sets the temperature T1 at the present time acquired in step S3 as the temperature T0 that is used as a reference temperature when the temperature change amount Td is calculated. That is, hereinafter, the temperature change amount Td indicates a temperature change amount of the fθ lens 64 from a time when the coefficient change timing came. In addition, in step S41, the control portion 100 sets the temperature gradient Tg generated before the change of the rotational speed of the motor 63 as a temperature gradient Tg0. Furthermore, in step S41, the control portion 100 sets the calculated color shift amount d1 of before the change of the rotational speed of the motor 63, as a calculated color shift amount d0.

It is noted that as another embodiment, one of the setting of the temperature T0 and the setting of the temperature gradient Tg0 performed in step S41 may be omitted. In addition, in a case where the setting of the temperature gradient Tg0 is omitted, a process similar to step S6 is executed in step S42 that is described in the following.

<Step S42>

In step S42, the control portion 100 calculates the temperature gradient Tg and the temperature change amount Td. Specifically, the control portion 100 calculates a value (T1−T2−Tg0) as the temperature gradient Tg, the value (T1−T2−Tg0) obtained by subtracting the temperature gradient Tg0 from the temperature difference between the temperature T1 and the temperature T2 detected by the first temperature detecting portion 67 and the second temperature detecting portion 68 at the present time, and the temperature gradient Tg0 being the temperature gradient at the time of the change of the rotational speed of the motor 63. Accordingly, the temperature gradient Tg calculated in step S42 is a value indicating a temperature gradient generated after the coefficient change timing, among temperature gradients of the housing 60 detected by the temperature gradient detecting portion 102. With this configuration, even if values of the coefficients K1 and K2 change before and after the coefficient change timing, sudden change of the calculated color shift amount d1 in step S44, described below, is prevented.

In addition, the control portion 100 calculates the temperature difference (T1−T0) between the temperature T1 and the temperature T0 as the temperature change amount Td. Here, in step S41, the temperature T1 at the coefficient change timing is set as the temperature T0. Accordingly, the temperature change amount Td calculated in step S42 is a change amount of the temperature T1 generated after the coefficient change timing, among change amounts of the temperature T1 detected by the first temperature detecting portion 67. With this configuration, even if the values of the coefficients K1 and K2 change before and after the coefficient change timing, the sudden change in the calculated color shift amount d1 in step S44, described below, is prevented.

<Step S43>

In step S43, the control portion 100 sets the coefficients K1 and K2 used in the second arithmetic expression in response to the rotational speed of the motor 63 at the present time. For example, when the rotational speed of the motor 63 is changed from the normal rotational speed to the changed rotational speed, the coefficients K1 and K2 are set to values set in correspondence with the changed rotational speed. In a similar manner, when the rotational speed of the motor 63 is changed from the changed rotational speed to the normal rotational speed, the coefficients K1 and K2 are set to values set in correspondence with the normal rotational speed.

<Step S44>

In step S44, the control portion 100 calculates the calculated color shift amount d1 based on the temperature T1 and temperature T2 acquired from the first temperature detecting portion 67 and the second temperature detecting portion 68, and the second arithmetic expression. More specifically, the calculated color shift amount d1 is calculated by substituting the temperature gradient Tg and temperature change amount Td calculated in step S42, and the coefficients K1 and K2 set in step S43, in the second arithmetic expression. With the calculated color shift amount d1 calculated in this way, it is possible to estimate a color shift amount generated when a color image is formed by the image forming units 1 to 4 at the present time.

Particularly, in the image forming apparatus 10, a total of the calculated shift amount calculated before the coefficient change timing, and the calculated shift amount calculated based on the temperature change amount generated after the coefficient change timing, among temperature changes of temperatures detected by the first temperature detecting portion 67, is calculated as the calculated color shift amount d1 based on the second arithmetic expression. In addition, in the image forming apparatus 10, a total of the calculated shift amount calculated before the coefficient change timing, and the calculated shift amount calculated based on the temperature gradient generated after the coefficient change timing, among temperature gradients of the housing 60 detected by the temperature gradient detecting portion 102, is calculated as the calculated color shift amount d1, based on the second arithmetic expression.

<Step S9>

In step S9, the control portion 100 corrects the emission start timing of each of the image forming units 1 to 4 based on the calculated color shift amount d1 calculated in step S8 or step S44. Here, the correction process of color shift in steps S3 to S10 is executed by the correction processing portion 104 of the control portion 100.

Specifically, in the present embodiment, the correction processing portion 104 changes the emission start timings of the image forming unit 1 and the image forming unit 3, among the image forming units 1 to 4, based on the calculated color shift amount d1. It is noted that the emission start timing is determined by time elapsed from a detection time of laser light by the light detecting portion 66.

<Step S10>

In step S10, the control portion 100 executes the image forming process for one time (one sheet) of the print job using the image forming units 1 to 4, based on the emission start timings corrected in step S9. More specifically, the image forming process includes a process in which light corresponding to a line of image data is emitted from the light source 61 at the emission start timing for every detection of laser light by the light detecting portion 66 of each of the image forming units 1 to 4. Here, such a process is executed by the light source controlling portion 101 of the control portion 100.

<Step S11>

Thereafter, in step S11, the control portion 100 determines whether or not the print job has ended. Here, as long as the control portion 100 determines that the print job has not ended (S11: No), the process returns to step S3, and when the control portion 100 determines that the print job has ended (S11: Yes), the color shift correction process ends. That is, while the print job is being executed, the correction process of the emission start timing in step S3 to S10 is executed in each round of the image forming process. It is noted that as another embodiment, the process in steps S3 and S10 may be executed once in, for example, several to several tens of executions of the image forming process (several to several tens of sheets).

In this way, in the image forming apparatus 10, even in a case where temperature inside the image forming apparatus 10 gradually increases during execution of the print job, color shift is prevented by the color shift correction that is performed based on the first arithmetic expression or the second arithmetic expression, without interrupting the image forming process during the print job and executing the color registration. In addition, the temperature inside the image forming apparatus 10 gradually decreases after the print job ends. Even when a print job is executed while the temperature inside the image forming apparatus 10 gradually decreases, color shift is prevented by the color shift correction that is performed based on the first arithmetic expression or the second arithmetic expression without executing the color registration.

In the image forming apparatus 10, the calculated color shift amount d1 is calculated based on the temperature T1 and temperature T2 detected by the first temperature detecting portion 67 and the second temperature detecting portion 68, the rotational speed of the motor 63, and the first arithmetic expression or second arithmetic expression, and color shift correction is executed based on the calculated color shift amount d1. Accordingly, shift of position in the main scanning direction of scanning light is corrected with high accuracy without using individual correction tables corresponding to, for example, situations such as temperature increase and temperature decrease.

Particularly, in the image forming apparatus 10, the total of the calculated shift amount calculated before the coefficient change timing, and the calculated shift amount calculated based on the temperature change amount generated after the coefficient change timing, among temperature changes of temperatures detected by the first temperature detecting portion 67, is calculated as the calculated color shift amount d1. In addition, the total of the calculated shift amount calculated before the coefficient change timing, and the calculated shift amount calculated based on the temperature gradient generated after the coefficient change timing, among temperature gradients of the housing 60 detected by the temperature gradient detecting portion 102, is calculated as the calculated color shift amount d1. Accordingly, it is possible to improve the accuracy of color shift correction with consideration of the change in the rotational speed of the polygon motor 63.

In addition, in the present embodiment, among the two laser scanning units 6, one laser scanning unit 6 is provided with one first temperature detecting portion 67, and the other laser scanning unit 6 is provided with one second temperature detecting portion 68. With this configuration, since each of the laser scanning units 6 is provided with one temperature detecting portion, the circuit substrate installed in the laser scanning unit 6 can be communalized. It is noted that the circuit substrate is common to a circuit substrate on which, for example, the light source 61 is installed, or a circuit substrate on which a driving circuit of the motor 63 is installed.

On the other hand, as another embodiment, a plurality of first temperature detecting portions 67 corresponding to a plurality of fθ lenses 64, and a plurality of second temperature detecting portions 68 corresponding to a plurality of light detecting portions 66 may be provided in the two laser scanning units 6. In this case, for example, the coefficient K1 and coefficient K2 may be individualized for each of the image forming units 1 to 4, and the correction processing portion 104 may individually calculate the color shift amount of each of the image forming units 1 to 4 based on the first temperature detecting portion 67 and second temperature detecting portion 68 corresponding to each of the image forming units 1 to 4. In addition, the correction processing portion 104 may realize color shift correction by changing the emission start timing of each of the image forming units 1 to 4. With this configuration, a color shift correction is realized with higher accuracy compared to a case where there is provided one first temperature detecting portion 67 and one second temperature detecting portion 68.

Meanwhile, positions of the first temperature detecting portion 67 and second temperature detecting portion 68 described in the present embodiment are not limited to positions shown in FIG. 2, as long as they are near the fθ lens 64 and the light detecting portion 66. For example, a position of the first temperature detecting portion 67 may be another position as long as the other position is appropriate for detection of the temperature of the fθ lens 64. For example, the first temperature detecting portion 67 may be provided at a position that is on an opposite side of the polygon mirror 62 when viewed from the fθ lens 64, and does not interfere with laser light. With this configuration, it is possible for the first temperature detecting portion 67 to detect the temperature of the fθ lens 64 at a position that receives little heat from the polygon mirror 62. Otherwise, the fθ lens 64 may be provided at a position between the polygon mirror 62 and the fθ lens 64 that do not interfere with laser light.

The invention claimed is:

1. An image forming apparatus comprising:
a light source;
a laser scanning member configured to scan light emitted from the light source;
a driving portion configured to rotationally drive the laser scanning member;
a speed controlling portion configured to change a rotational speed of the driving portion based on a preset image forming condition;
a light detecting portion configured to detect light made incident at a predetermined position along a scanning path of light scanned by the laser scanning member;
a light source controlling portion configured to, for each detection of light by the light detecting portion, cause the light source to emit light corresponding to a line of image data at a preset emission start timing;
a scanning lens configured to cause the light scanned by the laser scanning member to scan on an image-carrying member at a constant speed;
a housing in which the light source, the laser scanning member, the light detecting portion, and the scanning lens are disposed;
a temperature gradient detecting portion configured to detect a temperature gradient in the housing;
a first temperature detecting portion configured to detect a temperature of the scanning lens;
a second temperature detecting portion disposed at a position separate from the first temperature detecting portion, configured to detect a temperature of the light detecting portion; and
a correction processing portion configured to correct the emission start timing based on temperatures detected by the temperature gradient detecting portion and the first temperature detecting portion, the rotational speed of the driving portion, and a preset arithmetic expression, wherein
the temperature gradient detecting portion detects a difference in the temperatures detected by the first temperature detecting portion and the second temperature detecting portion, as the temperature gradient,
the correction processing portion calculates a shift amount of the emission start timing based on the temperature gradient detected by the first temperature gradient detecting portion, a change amount of the temperature detected by the first temperature detecting portion, and the rotational speed of the driving portion, and corrects the emission start timing based on the shift amount,
in a case where a temperature detected by the first temperature detecting portion during a predetermined reference time period is T0, a temperature detected by the first temperature detecting portion at a present time is T1, a temperature detected by the second temperature detecting portion at the present time is T2, a temperature gradient at a time when the speed controlling portion changes the rotational speed is Tg0, the shift amount of the emission start timing is d1, preset coefficients are K1 and K2, and a color shift amount calculated based on an expression (1) below before at least one of the coefficient K1 and the coefficient K2 is changed is d0:

$$d0 = K1 \times (T1 - T2 - Tg0) + K2 \times (T1 - T0) \quad (1),$$

the correction processing portion calculates, based on an expression (2) below, the shift amount d1 of the emission start timing:

$$d1 = K1 \times (T1 - T2 - Tg0) + K2 \times (T1 - T0) + d0 \quad (2),$$

and the correction processing portion changes at least one of the coefficient K1 and the coefficient K2 based on the rotational speed of the driving portion.

2. The image forming apparatus according to claim 1, wherein the correction processing portion changes content of the arithmetic expression in response to a change in the rotational speed of the driving portion by the speed controlling portion.

3. The image forming apparatus according to claim 2, wherein the correction processing portion changes the content of the arithmetic expression such that the faster the rotational speed of the driving portion is, the larger a correction amount of the emission start timing is.

4. The image forming apparatus according to claim 1, wherein the speed controlling portion changes, based on the image forming condition, a conveyance speed of a sheet that is an object for image formation, and the rotational speed of the driving portion, and the correction processing portion changes content of the arithmetic expression in response to a change in the conveyance speed of the sheet made by the speed controlling portion.

* * * * *